E. VAITH.
POLE TIP.
APPLICATION FILED APR. 3, 1914.
1,117,110.
Patented Nov. 10, 1914.
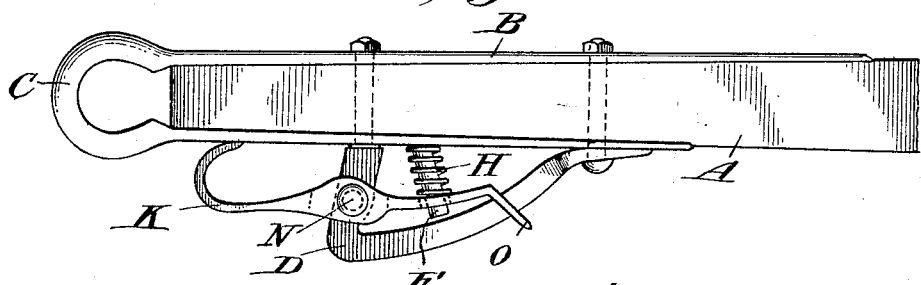
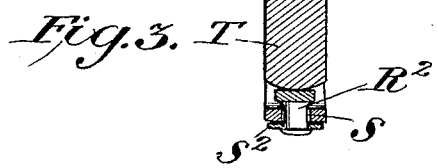
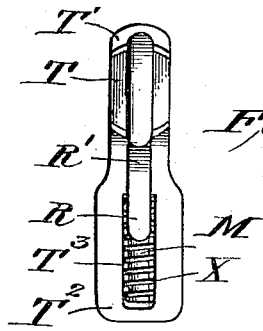
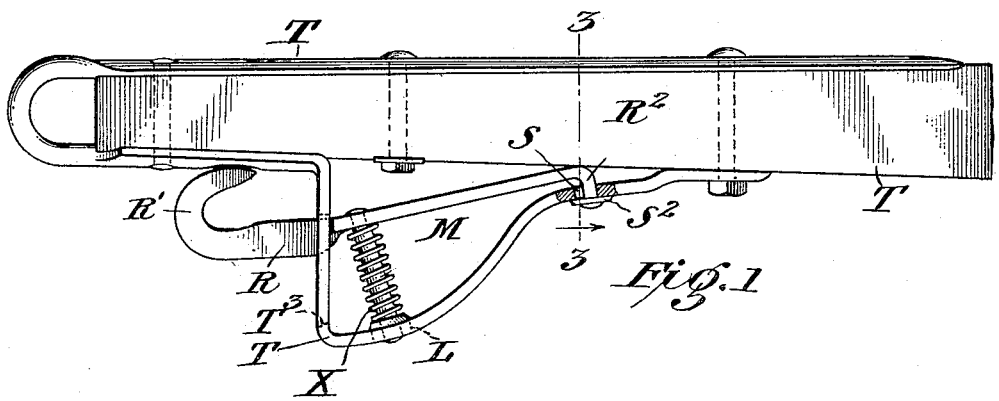

UNITED STATES PATENT OFFICE.

EDWARD VAITH, OF BROCKET, NORTH DAKOTA.

POLE-TIP.

1,117,110. Specification of Letters Patent. Patented Nov. 10, 1914.

Application filed April 3, 1914. Serial No. 829,261.

*To all whom it may concern:*

Be it known that I, EDWARD VAITH, a citizen of the United States, residing at Brocket, in the county of Ramsey and State of North Dakota, have invented certain new and useful Improvements in Pole-Tips; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in pole tips and comprises a simple and efficient device of this nature having various details of construction, combinations and arrangements of parts which will be hereinafter fully described, shown in the accompanying drawings and then specifically defined in the appended claim.

I illustrate my invention in the accompanying drawings, in which:

Figure 1 is a side elevation of a pole tip made in accordance with my invention. Fig. 2 is an end view. Fig. 3 is a cross sectional view on line 3——3 of Fig. 1. Fig. 4 is a side elevation of a modified form of the device, and Fig. 5 is a bottom plan view of the modified form.

In Fig. 1 of the drawings, which is the preferred form of the device, the pole tip is designated by letter T which has a bar of iron T' bent upon itself and fastened to the pole and is provided with an upwardly bent part $T^2$, slotted as at $T^3$ for the reception of the shank portion R of the hook R', which shank portion is bent at an angle at $R^2$ and passes through a slot S formed in said bar, and a crosspiece $S^2$ upon said angled end serves as a means for retaining said angled end in pivotal relation with said slot. A pin, designated by letter W, projects from the upper shank portion of the hook and is movable through a slot L formed in said bar. A spring X is mounted upon said pin and is interposed between a collar thereon and the shank portion of the hook, said spring tending to hold the nose of the hook in contact with the part of said bar which is fastened to the upper edge of the pole.

In the modified form shown in Figs. 4 and 5, A designates a pole having an iron strap B bent upon itself, forming a loop C at its forward end. D designates a bar which is bent at an angle as shown and fastened by bolts or other suitable means to the tip. Interposed between said bar D and the pole tip is an inclined rod F about which is a coiled spring H. A hook, designated by letter K, is pivotally mounted upon the pin N carried by the bar D and said hook is adapted to be held in contact with the iron strap B by means of said spring which bears against the under surface of one arm of the lever. Said lever, at its rear end, is forked as at O and is adapted to be guided in its tilting movements by said bar D.

What I claim to be new is:

A pole tip comprising, in combination with a pole, a bar bent to form a loop and secured to said pole, said bar bent at an angle and having a slot in a vertical portion thereof, a hook having pivotal connection with said bar, a portion of the hook movable within said slot, a pin projecting from said hook and movable through a slot in said bar, and a spring interposed between the latter and the shank of the hook, as set forth.

In testimony whereof I hereunto affix my signature in presence of two witnesses.

EDWARD VAITH.

Witnesses:
 E. O. ENGESATHER,
 C. VIERHUZ.

Copies of this patent may be obtained for five cents each, by addressing the "Commissioner of Patents, Washington, D. C."